(12) United States Patent
Yemm

(10) Patent No.: US 7,443,045 B2
(45) Date of Patent: Oct. 28, 2008

(54) WAVE POWER APPARATUS

(75) Inventor: Richard Yemm, Edinburgh (GB)

(73) Assignee: Ocean Power Delivery Limited, Edinburgh (GB)

( * ) Notice: Subject to any disclaimer, the term of this patent is extended or adjusted under 35 U.S.C. 154(b) by 119 days.

(21) Appl. No.: 10/551,811

(22) PCT Filed: Apr. 2, 2004

(86) PCT No.: PCT/GB2004/001443

§ 371 (c)(1),
(2), (4) Date: Jun. 16, 2006

(87) PCT Pub. No.: WO2004/088129

PCT Pub. Date: Oct. 14, 2004

(65) Prior Publication Data

US 2006/0273593 A1      Dec. 7, 2006

(30) Foreign Application Priority Data

Apr. 4, 2003      (GB) .................................. 0307827.6

(51) Int. Cl.
*F03B 13/10*      (2006.01)
*F03B 13/12*      (2006.01)
*H02P 9/04*       (2006.01)

(52) U.S. Cl. .......................................... 290/42; 290/53
(58) Field of Classification Search .................. 290/42, 290/53

See application file for complete search history.

(56) References Cited

U.S. PATENT DOCUMENTS

| 882,883 | A | * | 3/1908 | Hillson | 60/500 |
|---|---|---|---|---|---|
| 917,411 | A | * | 4/1909 | Caselia et al. | 60/500 |
| 1,018,678 | A | | 2/1912 | Nelson | 290/40 |
| 1,078,323 | A | * | 11/1913 | Trull | 417/332 |
| 3,135,162 | A | * | 6/1964 | Kamalian | 89/1.81 |
| 3,477,233 | A | * | 11/1969 | Andersen | 405/79 |
| 3,758,788 | A | * | 9/1973 | Richeson | 290/42 |
| 3,961,863 | A | * | 6/1976 | Hooper, III | 417/334 |
| 4,077,213 | A | | 3/1978 | Hagen | 60/500 |
| 4,098,084 | A | * | 7/1978 | Cockerell | 60/500 |

(Continued)

FOREIGN PATENT DOCUMENTS

GB      2 036 190      6/1980

(Continued)

OTHER PUBLICATIONS

International Search Report issued in PCT/GB2004/001443 mailed on Aug. 25, 2004.

(Continued)

*Primary Examiner*—Julio Gonzalez
*Assistant Examiner*—Pedro J Cuevas
(74) *Attorney, Agent, or Firm*—Marshall, Gerstein & Borun LLP

(57) ABSTRACT

A wave power apparatus includes a plurality of buoyant elongate body members, at least one adjacent pair of body members being interconnected by a linkage unit to form an articulated chain. Each body member of said pair is connected to the respective linkage unit by linkage means permitting relative rotation of the body members. A power extraction means, being located substantially within each linkage unit, is adapted to resist and extract power from the relative rotation.

34 Claims, 12 Drawing Sheets

U.S. PATENT DOCUMENTS

| | | | | |
|---|---|---|---|---|
| 4,118,932 | A * | 10/1978 | Sivill | 60/500 |
| 4,210,821 | A * | 7/1980 | Cockerell | 290/53 |
| 4,258,270 | A * | 3/1981 | Tornkvist | 290/53 |
| 4,327,297 | A * | 4/1982 | Harrison | 290/53 |
| RE31,111 | E * | 12/1982 | Hagen | 60/500 |
| 4,392,349 | A * | 7/1983 | Hagen | 60/500 |
| 4,408,455 | A * | 10/1983 | Montgomery | 60/505 |
| 4,408,965 | A | 10/1983 | Ekstrom | 417/331 |
| 4,568,836 | A * | 2/1986 | Reenberg | 290/53 |
| 4,684,815 | A * | 8/1987 | Gargos | 290/53 |
| 4,686,377 | A * | 8/1987 | Gargos | 290/53 |
| 6,476,511 | B1 * | 11/2002 | Yemm et al. | 290/42 |
| 6,863,806 | B2 * | 3/2005 | Stark et al. | 210/170.05 |
| 7,315,092 | B2 * | 1/2008 | Cook | 290/53 |
| 2002/0195823 | A1 * | 12/2002 | Aguirre | 290/53 |
| 2005/0236840 | A1 * | 10/2005 | Stark et al. | 290/53 |
| 2006/0208494 | A1 * | 9/2006 | Cook | 290/53 |
| 2007/0108768 | A1 * | 5/2007 | Dempster | 290/42 |
| 2007/0164569 | A1 * | 7/2007 | Wolfe | 290/53 |
| 2008/0018113 | A1 * | 1/2008 | Tal-or | 290/53 |
| 2008/0019847 | A1 * | 1/2008 | Burns et al. | 417/330 |
| 2008/0122225 | A1 * | 5/2008 | Smith | 290/42 |

FOREIGN PATENT DOCUMENTS

JP          59215969 A  * 12/1984

OTHER PUBLICATIONS

International Preliminary Examination Report issued in PCT/GB2004/001443 dated May 2, 2005.

* cited by examiner

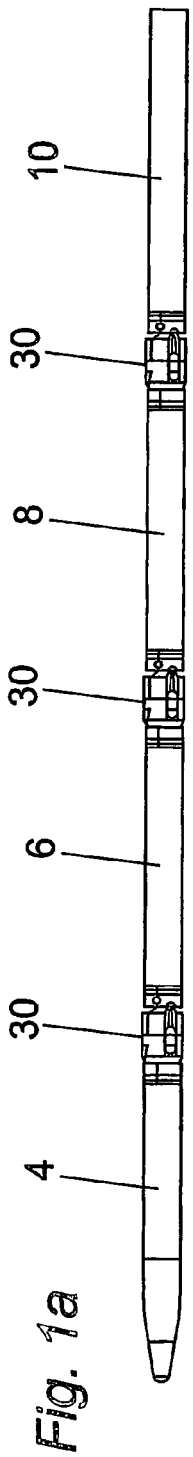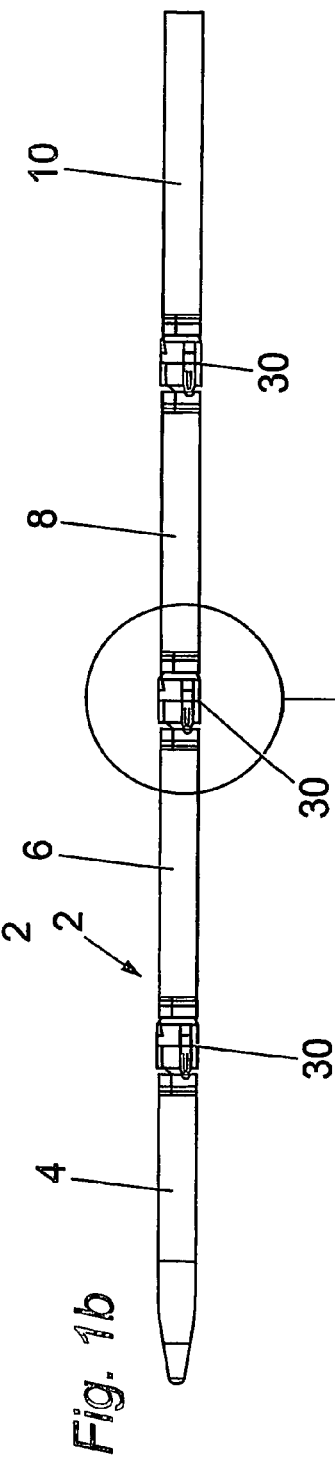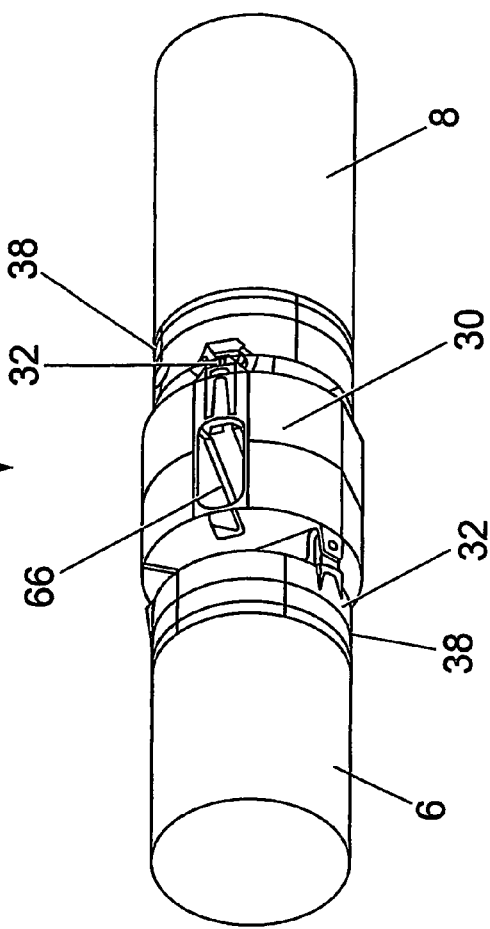

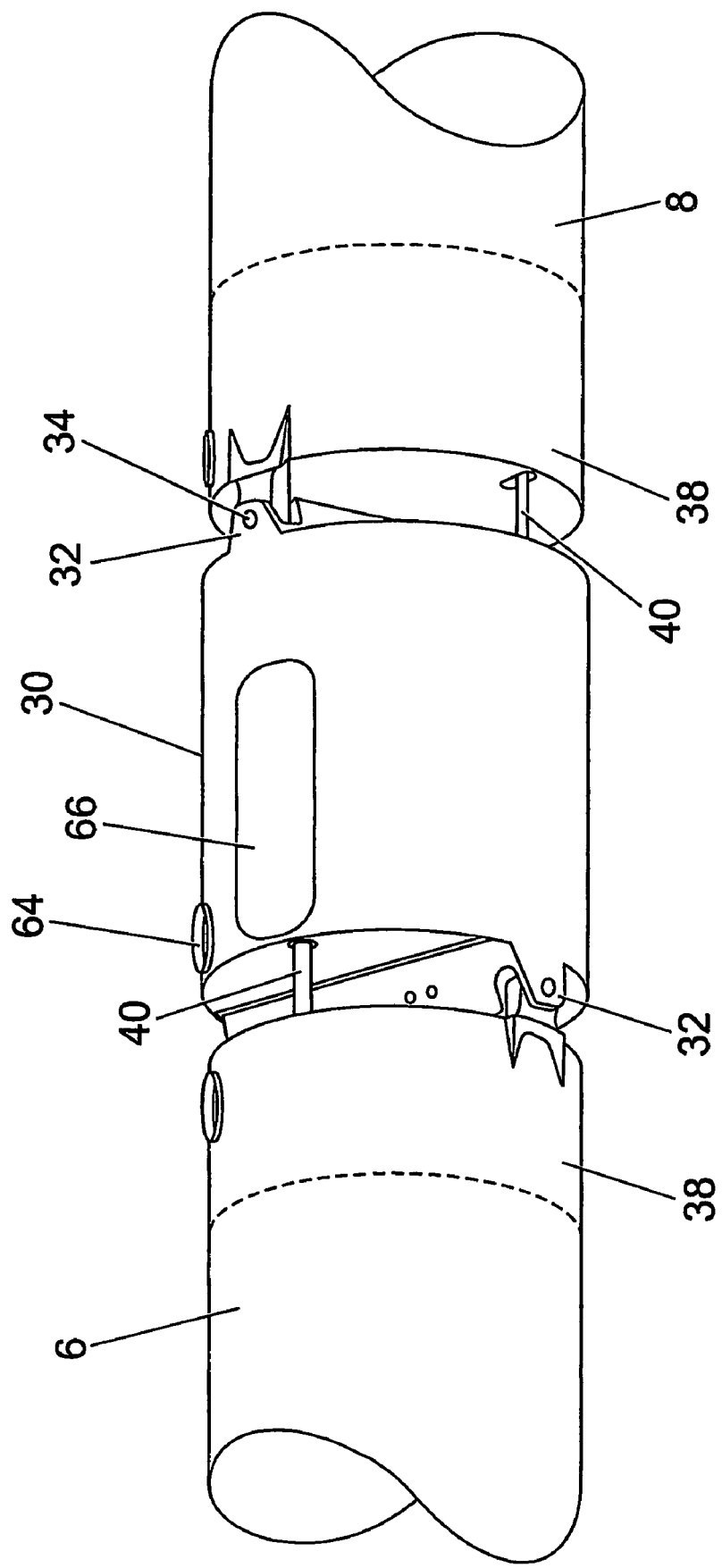

WAVE POWER APPARATUS

This invention relates to a linkage unit, apparatus and method, for extracting power from water waves, particularly ocean waves.

Ocean waves represent a significant energy resource. It is known to use a wave energy converter to extract power from such waves. An improved apparatus is shown in our WO 00/17519. This shows apparatus for extracting power from ocean waves comprising a number of buoyant cylinder body members connected together at their ends to form an articulated chain-like structure. Each pair of adjacent cylindrical members is directly connected together by coupling members which permit relative rotation of the cylindrical members about at least one axis. Preferably, adjacent coupling members permit relative rotation about mutually orthogonal transverse axes.

It is an object of the present invention to provide further improved apparatus and method for extracting power from waves.

According to a first aspect of the present invention, there is provided wave power apparatus comprising:

- a plurality of buoyant elongate body members, at least one adjacent pair of body members being interconnected by a linkage unit to form an articulated chain, each body member of said pair being connected to the respective linkage unit by linkage means permitting relative rotation of the body members; and
- power extraction means adapted to resist and extract power from the relative rotation, the power extraction means being located substantially within each linkage unit.

Preferably the body members are arranged consecutively in an articulated apparatus, each adjacent pair of body members being interconnected by a linkage unit to form an articulated chain.

Preferably the or each linkage unit has a longitudinal length substantially shorter than the body members.

Preferably the body members substantially comprise hollow members devoid of active components.

Preferably each body member has one or more end caps with corresponding linkage means to marry with the linkage means of the linkage unit.

Preferably the linkage unit is arranged to permit relative rotation between the linkage unit and a first body member about a first axis of rotation at a first end of the linkage unit, and to permit relative rotation between the linkage unit and a second body member about a second axis of rotation at a second end of the linkage unit.

Preferably the power extraction means includes a hydraulic ram assembly.

Preferably the hydraulic ram assembly comprises a plurality of rams.

Preferably the power extraction means includes a hydraulic ram assembly for each axis of rotation.

Preferably the power extraction means includes two hydraulic ram assemblies acting about each axis of rotation.

Preferably the end caps have a number of cavities to receive respective ends of the power extraction means.

Preferably the power extraction means has at least one seal, such as a bellows or diaphragm seal, to prevent ingress of water into the linkage unit and/or body members.

Preferably the linkage unit includes one or more power generation or storage means connected to one or more of the power extraction means.

Preferably the linkage unit includes a first power generation means connected to one or more power extraction means at one axis of rotation, and a second power generation means connected to one or more power extraction means at the other axis of rotation.

Preferably the first or second power generation means is connectable to at least one power extraction means from each axis of rotation, such that the restraint of the linkage unit is maintained in the event of failure of one of the power extraction or generation means.

Preferably the first and second power generation means is connectable to one or more of the power extraction means from one or both axes of rotation, such that when the apparatus is operating at partial capacity, the one or more power extraction means is connected solely to the first or second power generation means.

Preferably constraint is applied to each power extraction means of the linkage unit in order to induce a cross-coupled response which may be tuned to be resonant in small waves to increase power capture and which may be set in large waves to limit power absorption and maximise survivability.

Preferably the apparatus includes one or more of a ballasting system, mooring system, and means to apply a roll bias angle to the axes of rotation.

Preferably the linkage unit includes access means, such as one or more hatches, to allow inspection, repair and maintenance on or off site.

The power extraction means may be integral with, linked to or separate from the linkage means.

In one embodiment of the present invention, separate linkage means are provided for the movement about each axis. Each linkage means may be independent, or may be linked to other linkage means.

The nature of the buoyant body members may correspond with the description of said members in WO 00/17519, which is included herein by way of reference. That is, said body members are preferably substantially elongate, cylindrical, and will form a chain-like structure. The apparatus preferably has a length of the same order of magnitude as the longest wavelength of the waves from which power is extracted, and may be free to adopt an equilibrium position with respect to any instantaneous wave pattern.

The linkage unit preferably includes one or more controllers, more preferably one controller or control means within the linkage unit. The linkage unit preferably includes sufficient access means, such as one or more hatches, to allow inspection, repair and maintenance on site, i.e. as located between two body members at sea.

The apparatus may be further defined and used as described in WO 00/17519. This includes possibly including a slack mooring system, and possibly having means to orientate the apparatus such that under normal operating conditions, it spans at least two wave crests. The mooring system may also include means to vary the angle of orientation of the chaining of body members to the mean wave direction to maximise power extraction. The apparatus may also further comprise means to apply a roll angle to an axis of relative rotation away from the horizontal and/or vertical.

The apparatus may also include one or more elements adapted to resist relative rotational movement of said body members, which may be a spring and/or damping elements. Magnitudes of constraint could be applied to a plurality of said elements in order to induce a cross-coupled response.

The apparatus could also be provided with a ballasting system, which possibly comprises ballast tanks comprising inlet means and outlet means, and wherein the ballasting system varies the roll bias angle of the chain-like structure.

According to a second aspect of the present invention, there is provided a linkage unit for use in the apparatus of claim 1, comprising:

linkage means for interconnection between the body members permitting relative rotation at either end of the unit;

power extraction means adapted to resist and extract power from the relative rotation of the body members;

the power extraction means being located substantially within the linkage unit.

Preferably the linkage unit is arranged to permit relative rotation between the linkage unit and a first body member about a first axis of rotation at a first end of the linkage unit, and to permit relative rotation between the linkage unit and a second body member about a second axis of rotation at a second end of the linkage unit.

Preferably the power extraction means includes a hydraulic ram assembly.

Preferably the hydraulic ram assembly comprises a plurality of rams.

Preferably the power extraction means includes a hydraulic ram assembly for each axis of rotation.

Preferably the power extraction means includes two hydraulic ram assemblies acting about each axis of rotation.

Preferably the power extraction means has at least one seal, such as a bellows or diaphragm seal, to prevent ingress of water into the linkage unit and/or body members.

Preferably the linkage unit includes one or more power generation or storage means connected to one or more of the power extraction means.

Preferably the linkage unit includes a first power generation means connected to one or more power extraction means at one axis of rotation, and a second power generation means connected to one or more power extraction means at the other axis of rotation.

Preferably the first or second power generation means is connectable to at least one power extraction means from each axis of rotation, such that the restraint of the linkage unit is maintained in the event of failure of one of the power extraction or generation means.

Preferably the first and second power generation means is connectable to one or more of the power extraction means from one or both axes of rotation, such that when the apparatus is operating at partial capacity, the one or more power extraction means is connected solely to the first or second power generation means.

Preferably constraint is applied to each power extraction means of the linkage unit in order to induce a cross-coupled response which may be tuned to be resonant in small waves to increase power capture and which may be set in large waves to limit power absorption and maximise survivability.

Preferably the linkage unit includes access means, such as one or more hatches, to allow inspection, repair and maintenance on site.

According to a third aspect of the present invention, there is provided a method of extracting power from waves comprising the steps of:

deploying an apparatus as described in the first aspect of the present invention;

orientating the structure such that a front end of the structure faces into the oncoming waves; and extracting the power absorbed in the or each linkage unit.

Preferably the apparatus of the method includes independent systems for each axis of relative movement, and means to operate each system either independently or in a linked action. One advantage of this is that the failure of one system still allows the other system to operate independently, maintaining restraint on the linkage. Alternatively or additionally, where there are a plurality of individual linkage means or power extraction means acting about each axis of rotation, the apparatus may include further independent systems that are split or otherwise designed in such a way that in the event of failure on one of the systems, restraint may be maintained about both or all axes of relative movement.

According to a fourth aspect of the present invention, there is provided a method of manufacture of apparatus according to the first aspect of the present invention, comprising the step of:

interconnecting each pair of adjacent body members of the apparatus with a linkage unit described in the second aspect of the present invention.

Preferably the body members and linkage unit(s) are connected together close to or on site.

Preferably the linkage unit(s) are fully assembled and tested before being transported to site.

Preferably the method can be carried out close to site, on site or in situ, because the linkage unit(s) can be fully assembled, analysed and tested, for example on a test rig, relating to its power extraction prior to its installation and use.

Embodiments of the present invention will now be described by way of example only with reference to the accompanying drawings in which:

FIGS. 1a and 1b show overall plan and side views of apparatus of the present invention;

FIG. 5 shows a detail of the apparatus in FIG. 1 illustrating a linkage unit of the present invention;

FIGS. 6, 7 and 12 show different external and part-internal views of the linkage unit in FIG. 5;

FIG. 8b shows detail in circle A in FIG. 8a;

FIG. 8c shows detail of the dual seal system in circle B in FIG. 8a;

Figure 2:
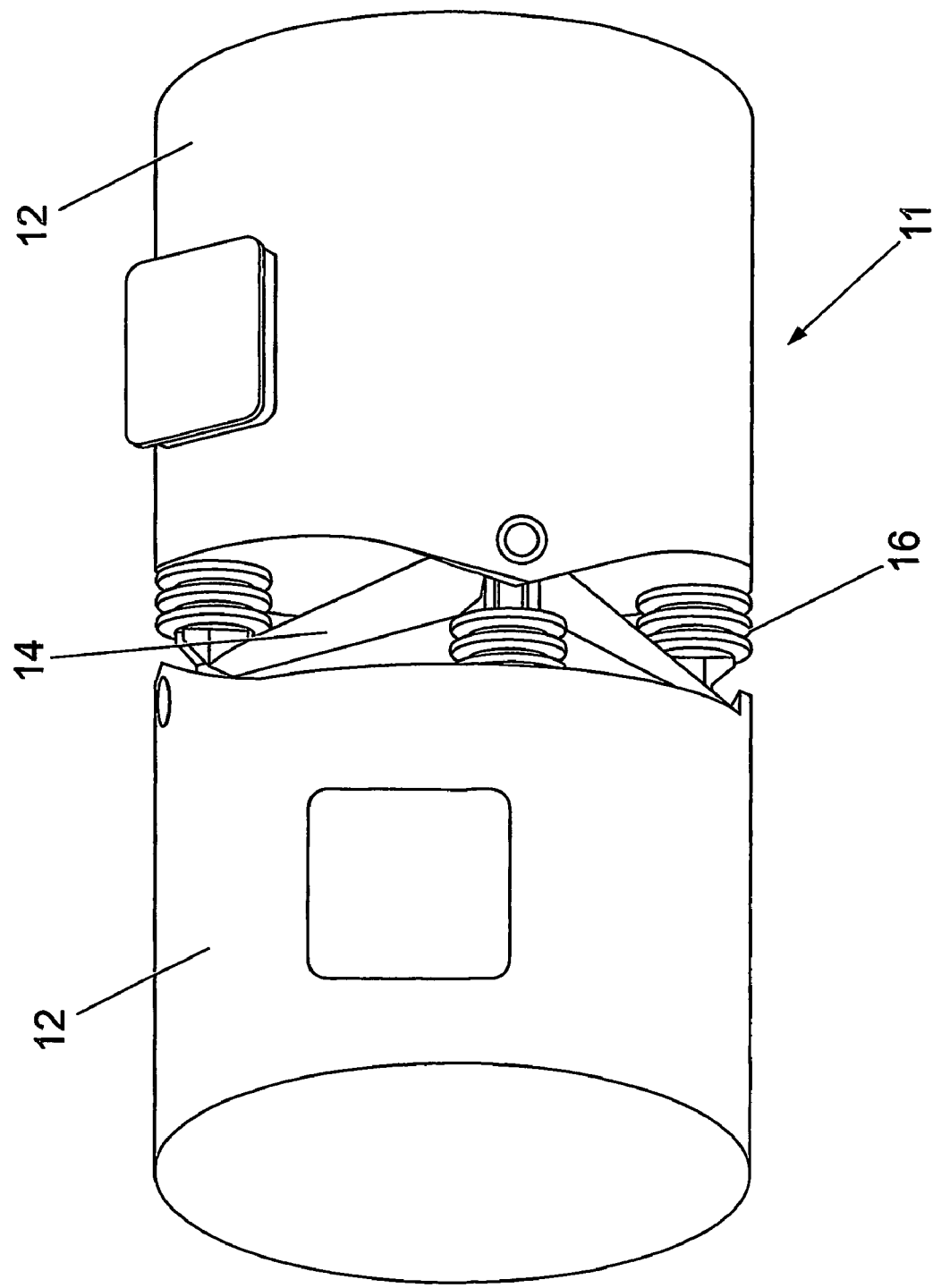
FIG. 2 shows a perspective view of part of prior art apparatus according to the one embodiment of the invention shown in WO 00/17519 for directly linking body members.

Referring to the drawing, FIGS. 1a and 1b show an apparatus 2 for extracting power from waves having, for this example, four buoyant body members 4, 6, 8, 10. The number, size and shape of the body members involved is generally determined by the annual wave climate of the locality in which it is used, and by the conditions it is likely to encounter.

The body members 4, 6, 8, 10 may be of any size or shape. They are substantially hollow and may be cylindrical or non-cylindrical. If cylindrical, they may be of circular or non-circular cross-section. Generally the body members 4, 6, 8, 10 are cylindrical, and have sufficiently small depth and freeboard to experience complete submergence and emergence in large waves (as is discussed in our WO 00/17519). That is, the overall chain-like structure of the apparatus 2 may be configured to encourage hydrostatic clipping in extreme conditions. The body members 4, 6, 8 and 10 may be provided with fins, bilge keels or other protrusions to add hydrodynamic damping to any direction of motion desired.

The front body member 4 is provided with a streamlined (for example conical) front end to minimise drag in extreme seas, whilst the rear body member 10 has a flat rear end to increase damping along the axis of the chain structure to add damping to the mooring response.

The body members 4, 6, 8, 10 may be formed from any suitable material. Concrete is one suitable material, although steel or fibreglass are also useable.

The body members 4, 6, 8, 10 are preferably ballasted to float with its centre line on or near the water-plane (approximately 50% displacement by volume). The body members 4, 6, 8, 10 could include an active or passive ballasting system, which varies the level at which the individual body members or the complete apparatus floats. If incorporated, the ballasted system may be capable of being disabled and/or removed. The ballasting system hastens the onset of hydrostatic clipping in extreme seas, thus helping to minimise the maximum loads and bending moments which the apparatus 2 is subject to in adverse weather conditions. A variable ballasting system useable with the present invention is shown and discussed in our WO 00/17519.

Figure 3:
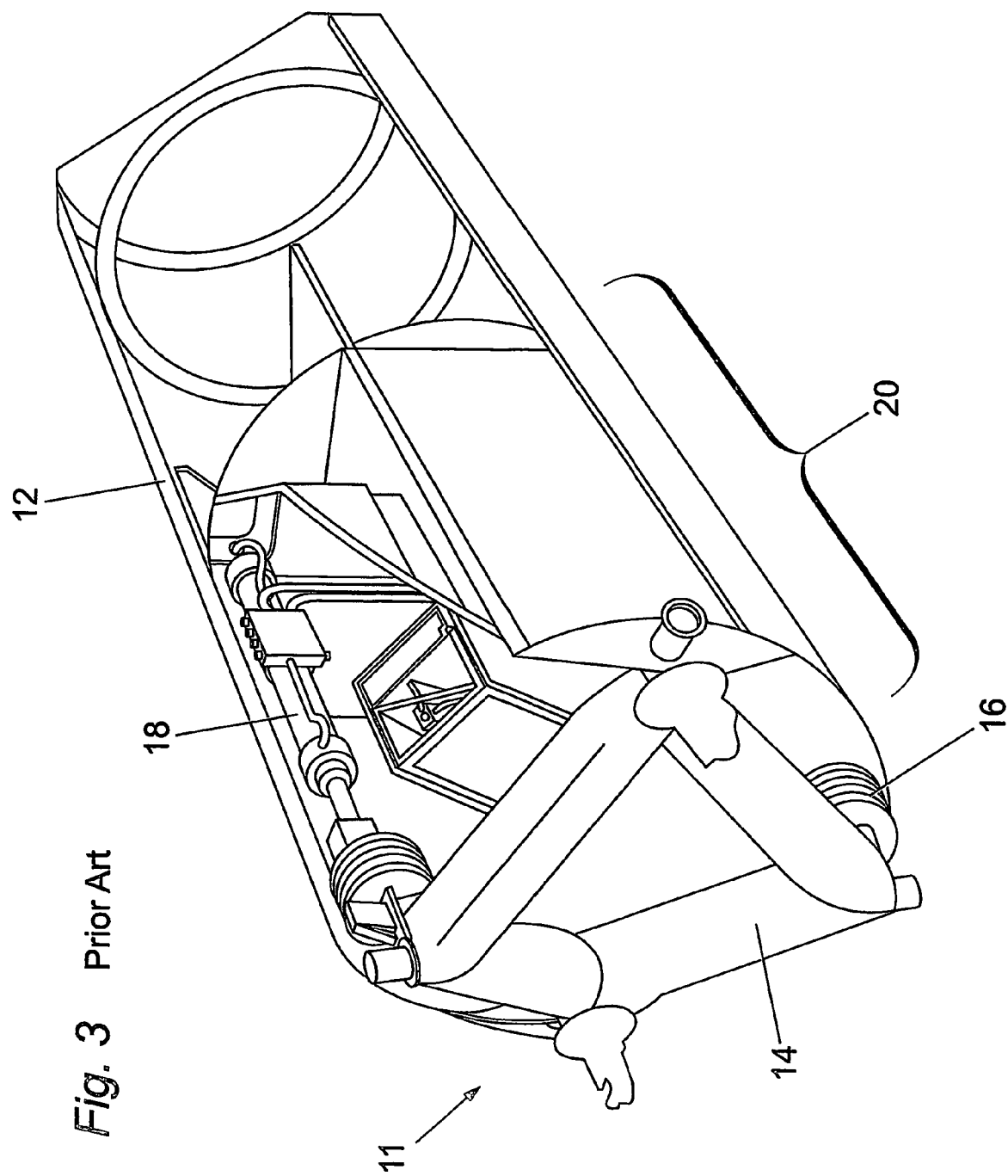
FIG. 3 shows front and inside detail of one part of FIG. 2.
Figure 4:
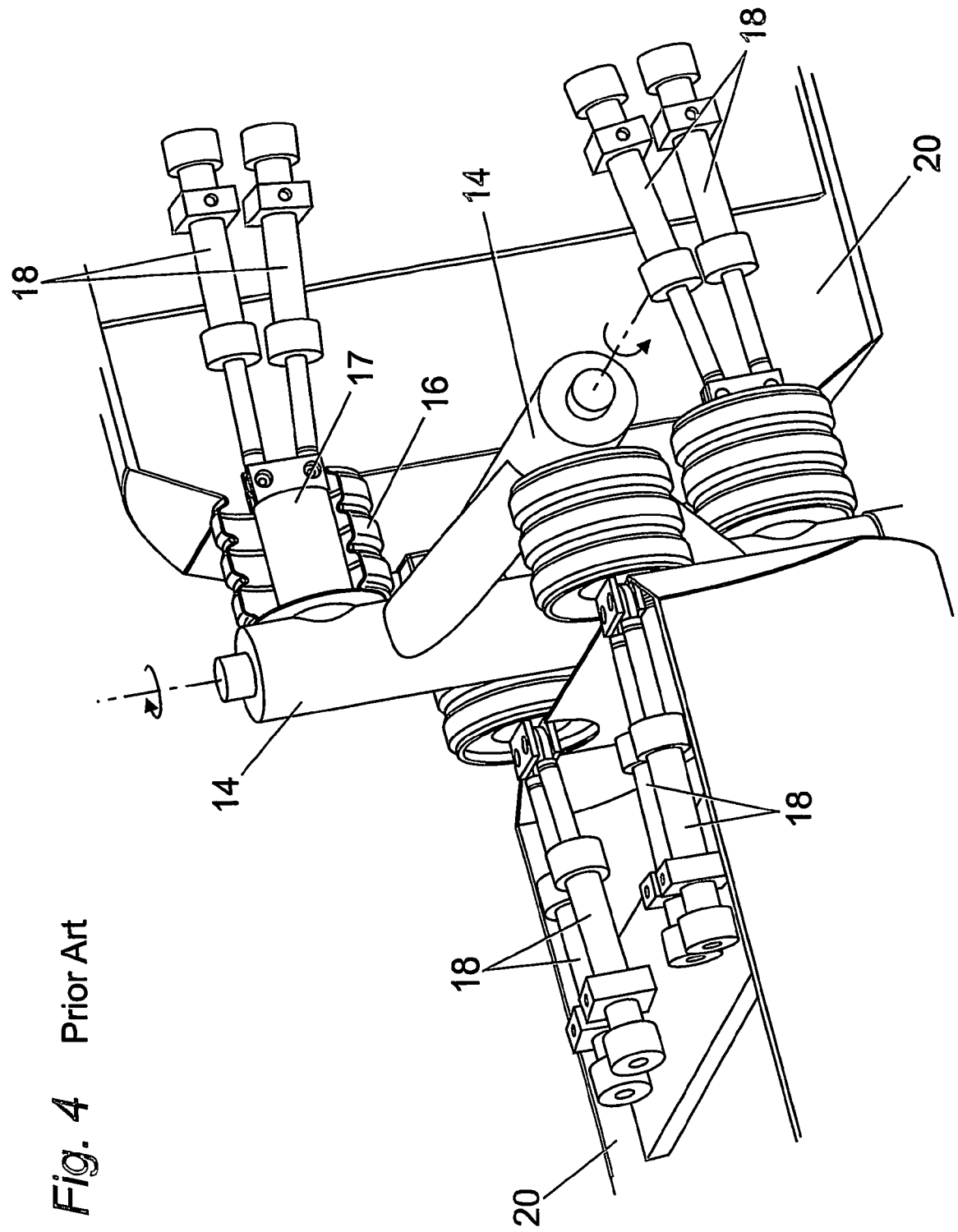
FIG. 4 shows a schematic line drawing of the conjunction in FIGS. 2 and 3.

FIGS. 2-4 show one arrangement for connecting two similar body members of the apparatus for extracting power shown in WO 00/17519. Between the body members 12 of the prior art apparatus 11, there is shown a joint spider 14 adapted to provide rotational movement directly between the body members 12 about two orthogonal axes. Seals 16 cover stubs 17, shown more clearly in FIG. 4, which actuate rams 18 in sealed compartments 20 at the end of each body member 12.

Whilst the known arrangement shown in FIGS. 2-4 provides the benefit of a wave energy apparatus or converter, it requires the manufacture and use of the linkage mechanisms and power extraction means or ram-housing compartments to be made and attached separately to the remaining parts of the body members 12. A typical length of a body member is 27 meters long, requiring either significant transportation of completed body members made in a suitable location, or significant assembly of the separate compartments 20 to the main lengths of body members 12 on site, generally at or near beaches and other sea locations, which may not provide suitable assembly conditions.

Furthermore, each ram-housing compartment 20 requires its own power generation means or components and connected hydraulic systems, and must be separately tested prior to installation and use. Such testing may or may not be in conjunction with the main part of the body members 12, being 27 meters long. Also, in the event of failure of the linkage or joint hydraulic system, restraint on the joint may be lost, possibly leading to further damage or failure. Whilst it is possible to provide independent systems in this arrangement for each of the individual restraint means acting about a particular axis of rotation; it is not economic to do so.

As shown in FIGS. 1, 5, 6 et al, the present invention provides a linkage unit 30 for interconnection between a plurality of adjacent buoyant body members 4, 6, 8, 10. Each adjacent pair of body members 4, 6, 8, 10 is interconnected by a linkage unit to form an articulated chain, consecutively arranged. The linkage unit 30 comprises linkage means 31 to conjoin the unit 30 with the respective ends of each adjacent pair of body members 4, 6, 8, 10 to permit relative movement of said body members 4, 6, 8, 10 about two axes of rotation.

The linkage unit 30 may be of any shape and size determined by the annual wave climate of the locality in which it is used, and by the weather conditions it is likely to encounter, i.e. the shape and size will be site-specific. Generally, the linkage unit 30 is the same shape as the body members 4, 6, 8, 10, for example cylindrical, and has a longitudinal length substantially shorter than the body members, for example approximately 5 meters, but may be of similar length to the body members.

Figure 7:
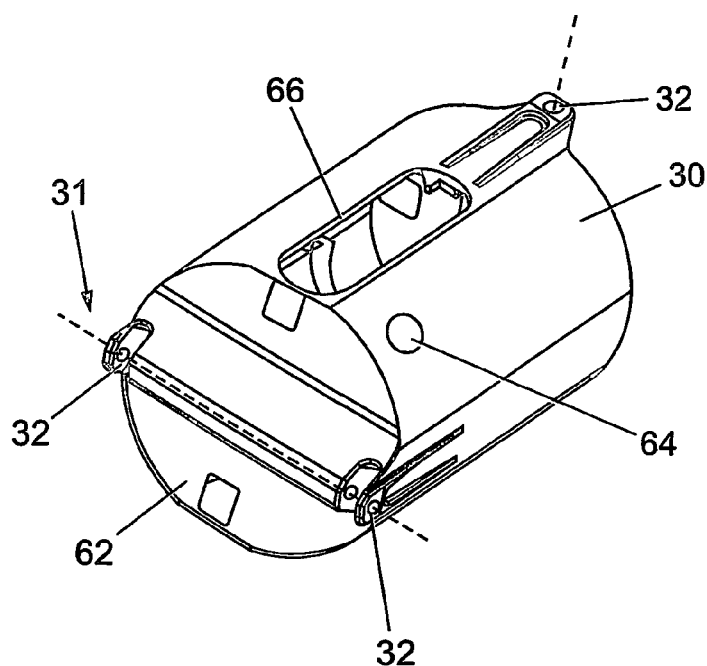
Figure 8A:
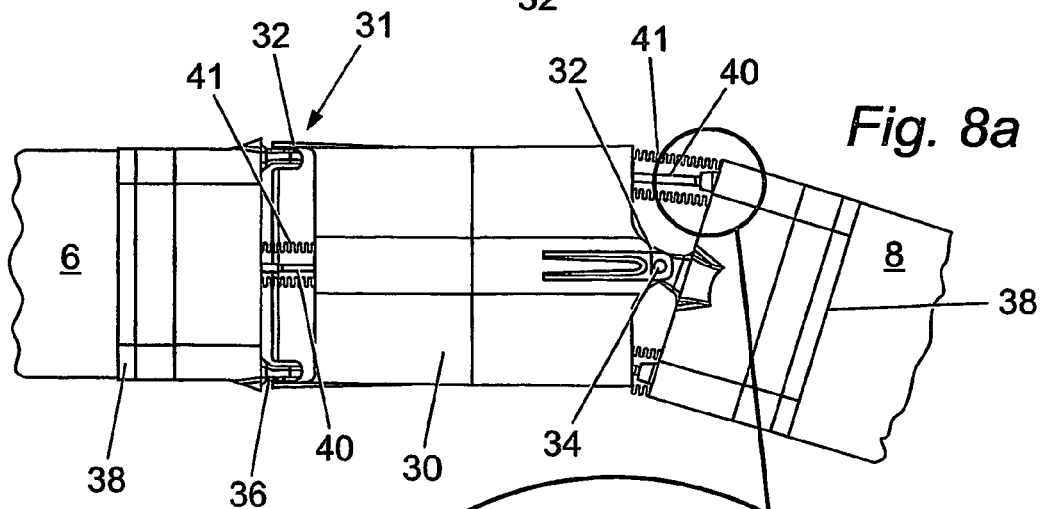
FIG. 8a shows detail of the linkage between the linkage unit and a buoyant body member.

The linkage means 31 is shown in more detail in FIGS. 7 and 8a. Each end of the linkage unit 30 has a set of two bearings 32, each set of bearings 32 set at substantially orthogonal angle to the other set. Each set of bearings 32 is adapted to hold a pin 34 (not shown in FIG. 7) along each axis.

Also attachable to each pin 34 are bearings 36 on the relevant ends of the adjacent pair of body members 4, 6, 8 and 10. The body member bearings 36 are preferably conjoined with the main segments of the body members 4, 6, 8, 10 by means of end-member caps 38, made for example of steel. Thus, an end cap 38 need only comprise a cast or otherwise manufactured piece having two bearings and two ram housings or cavities 35. No moving parts are involved, leading to significantly reduced manufacture, attachment, maintenance and repair, etc. Moreover, there are no complex or active components, for example, power extraction means, hydraulic systems, power generation or storage means, accumulators, motors, low pressure reservoirs, heat exchangers, gas backup bottles etc., within the body members 4, 6, 8, 10. The linkage bearings 32, 36 may be provided with external seals 41 to allow the bearings and pins 34 to be accessed for inspection, maintenance or repair insitu or near-site without water ingress into the linkage unit and/or body members.

Thus, each linkage unit 30 allows rotational movement about one axis with one body member 4, 6, 8, 10, and rotational movement about an orthogonal axis with its other conjoined body member 4, 6, 8, 10. In this way, the linkage unit 30 allows the body members 4, 6, 8, 10 relative movement about two axes (based along the axes of the pins 34).

The relative movements between the linkage units 30 and body members 4, 6, 8 and 10 are resisted and extracted by power extraction means which extract power from this relative motion. The power extraction means may be any suitable means adapted to be activated by this relative motion. One such means is a damping element in the form of a hydraulic ram and piston assembly.

In the present embodiment of the invention shown, two hydraulic ram assemblies 40 are provided at each end of the linkage unit 30, and on each side of the linkage unit-body member linkage means. The parts of the assemblies 40 between the unit 30 and end caps 38 will generally be enclosed by flexible seals 41 to accommodate axial motion of the ram assemblies 40 extending and retracting, as known in the art.

Figure 8B:
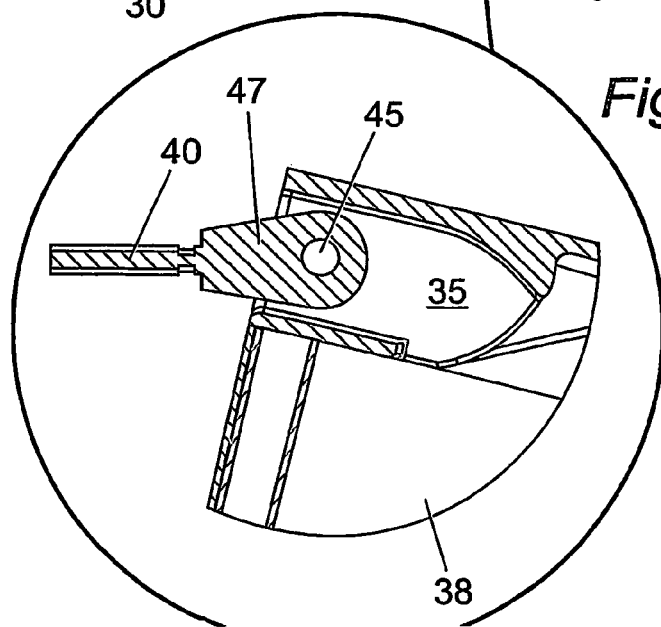
Figure 8C:
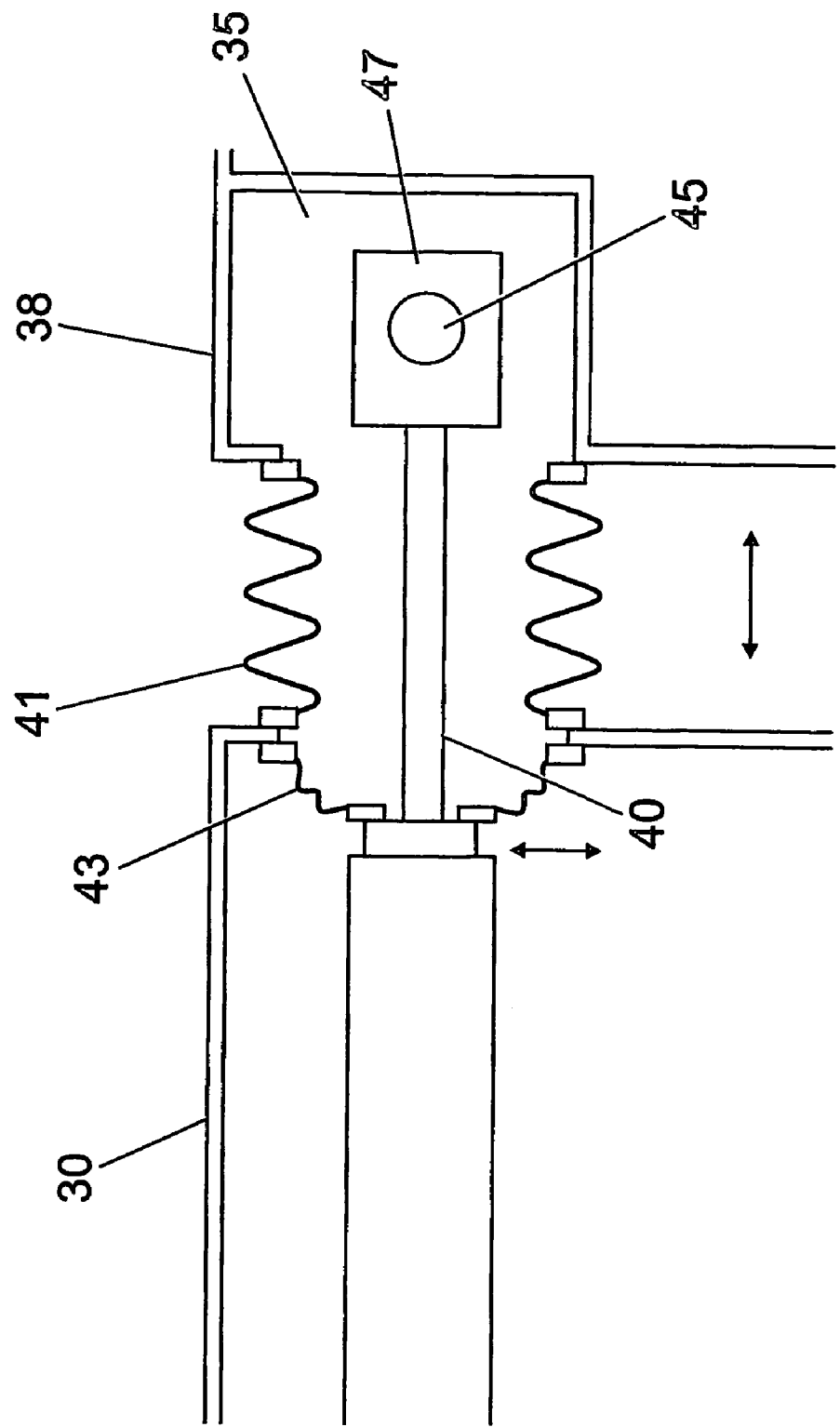

Inner diaphragm seals 43 could also be incorporated to assist single seal-failure problems, as shown in FIG. 8c. The inner diaphragm seals 43 accommodate small slewing motion of respective ends of the ram assemblies 40.

As shown in FIG. 8b, the end of the ram of a ram and piston assembly 40 can travel along a suitable ram cavity 35 within the end cap 38 of a body member 4, 6, 8, 10. The role of the cavity 35 is two-fold:

1. To provide a sealed compartment to prevent water ingress into the end caps 38 in the event of failure of the external flexible seal 41, and,
2. In the event of failure of the hydraulic systems, to allow the ram 40 to break free at the attachment pin 45 if it reaches its end stop (in a manner similar to a shear pin on outboard motor propellers). This limits the maximum loads that the structure must be designed to sustain, reducing cost and the likelihood of major or complete failure. In the event of the shear pin breaking, the cavity 35 is provided with a weak end wall to allow the ram 40 to punch through, and therefore give greatly increased joint motion to prevent extreme loads in the structure.

FIG. 8b does not show the inner and outer seals 41 and 43 for clarity.

Figure 9:
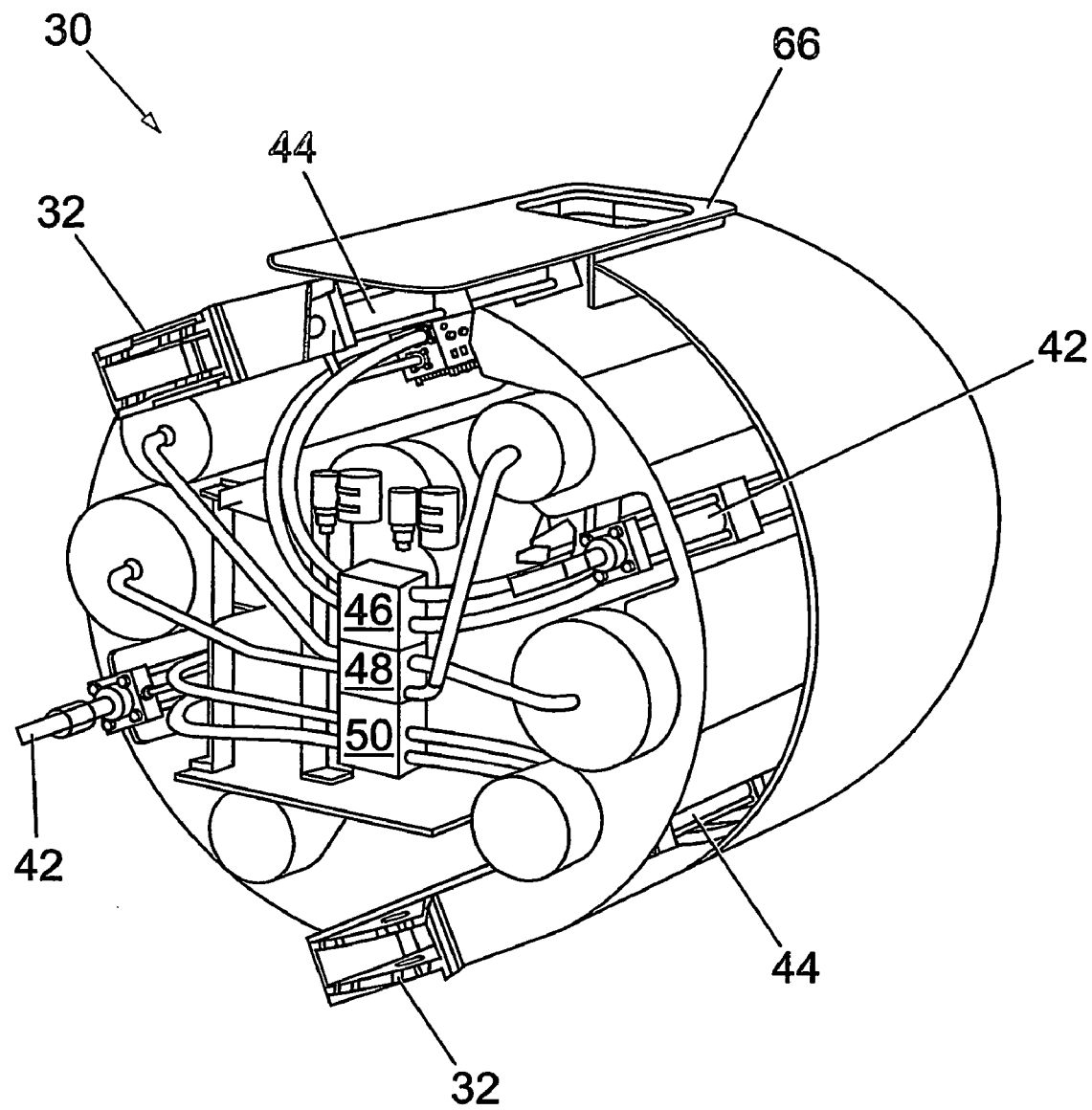
FIG. 9 shows a front perspective internal detail of a linkage unit of FIG. 5.
Figure 10:
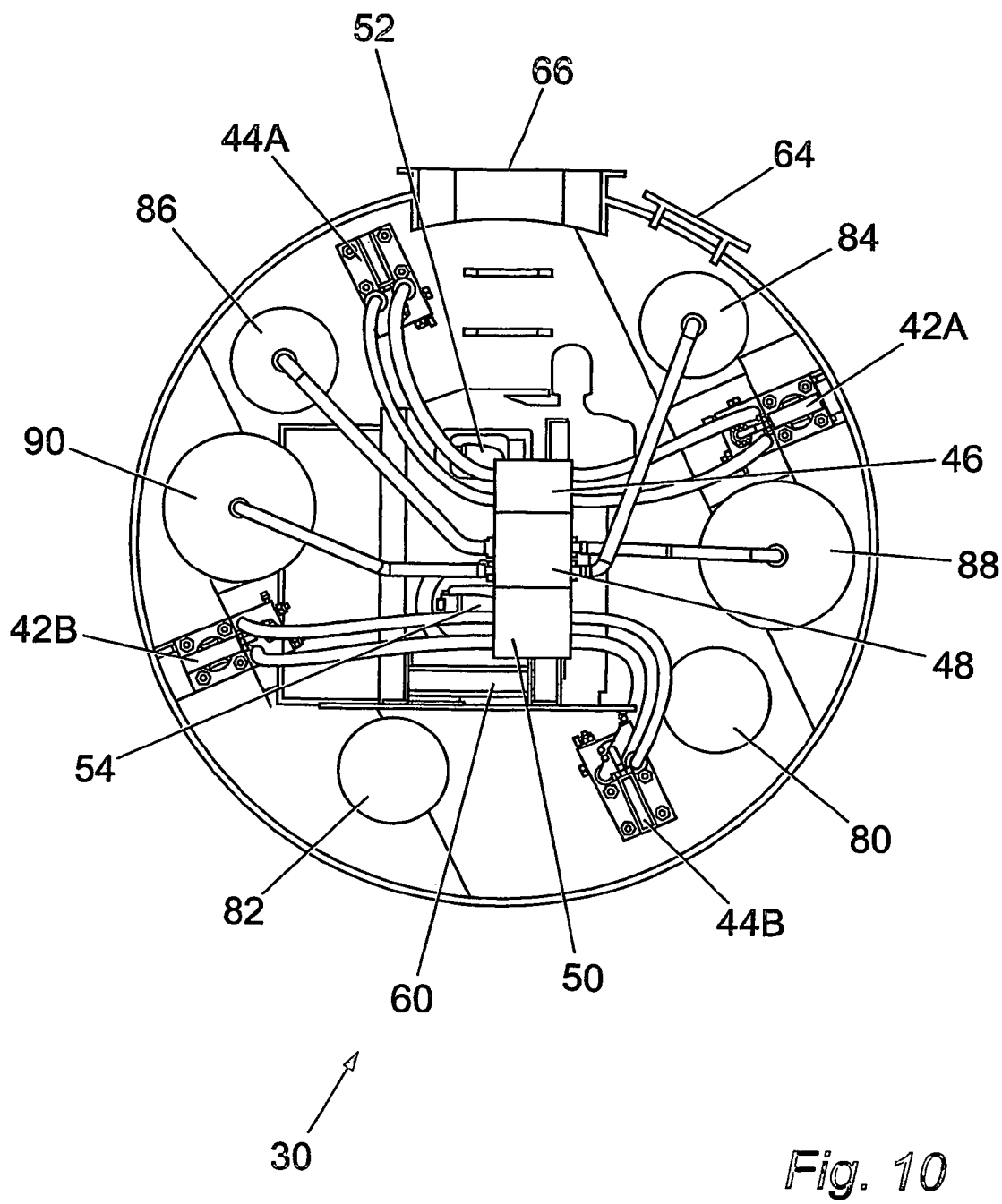
FIG. 10 shows a front plan internal line drawing of linkage unit of FIG. 9.

FIGS. 9 and 10 show internal details of the linkage unit 30. One set of bearings 32 are shown, set at a substantially orthogonal angle to two hydraulic ram assemblies for connecting the shown face of the linkage unit 30 to a body member 4, 6, 8, 10.

Ram assemblies 42A, 42B are substantially sway rams, as shown in FIG. 10. However they are not solely sway rams as the rams 42A, 42B can be used to induce a cross-coupled response which may be tuned to be resonant in small waves to increase power capture and which may be set in large waves to limit power absorption and maximise survivability.

One end of these rams 42A, 42B are rotatably attached to a pin 45 within a cavity 35 located in the cap-end 38 of an adjacent body member 4, 6, 8, 10.

FIG. 10 shows orthogonally located hydraulic ram assemblies 44A, 44B which are substantially, but not solely, heave rams which can also be used to induce a cross-coupled response as described in the above paragraph.

These heave rams 44A, 44B are attached to a pin 45 within a cavity 35 located in the cap end 38 of an opposing adjacent body member 4, 6, 8, 10.

Heave ram 44A and sway ram 42A are connected to a first main manifold 46 which can feed towards a central manifold 48. Similarly, Heave ram 44B and sway ram 42B are connected to a second main manifold 50 which can feed via a one way valve into the central manifold 48. The central manifold 48 controls top and bottom motors 52, 54.

FIGS. 9 and 10 also show accumulators 84 and 86 and reservoirs 88 and 90 which feed into the central manifold 48, as well as gas backup bottles 80 and 82. The back-up bottles 80 and 82 provide the optimum gas to oil volume ratio ensuring optimal energy storage over the required pressure range.

In use, the rams 42, 44 pump high pressure oil into the accumulators 84, 86 via the manifolds 46, 48 and 50. The pressure in the accumulators 84, 86 can be matched to the incident sea state by controlling the rate at which the oil flows out through the motors 52, 54.

The configuration shown in FIGS. 9 and 10 has the advantage of being two sets of hydraulic and generation components providing split hydraulic circuits through the two main manifolds 46, 50. This gives the system redundancy in the event of failure of a single circuit, allowing the system to maintain restraint of the joint between the body members 4, 6, 8, 10. This concept is similar to that of dual circuit brakes on a car. This is shown in more detail in FIGS. 11a and 11b.

Figure 11A:
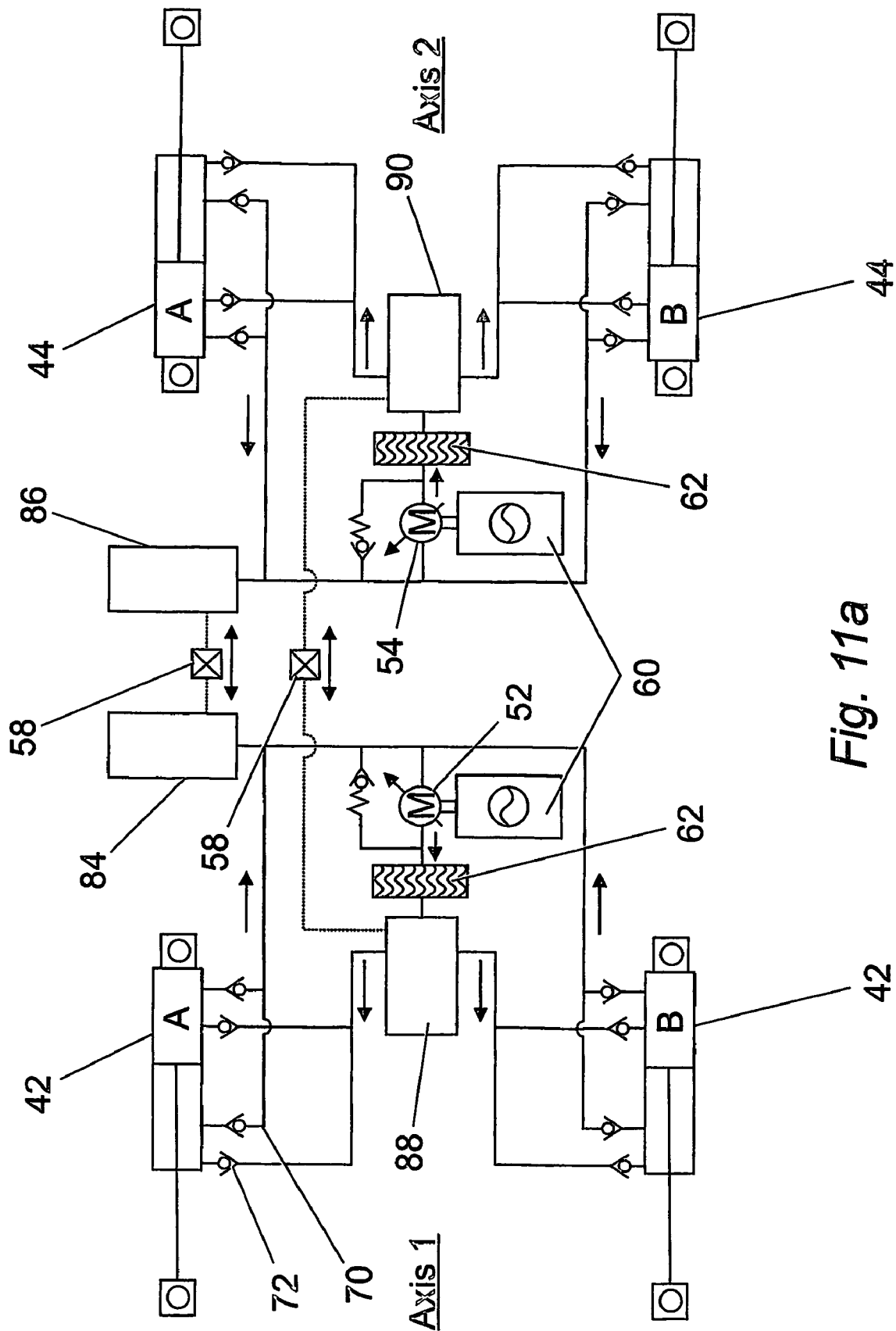
FIGS. 11a and 11b show two schematic hydraulic systems for the linkage unit.

FIG. 11a shows schematically a first useable split hydraulic circuit system inside the linkage unit 30. The first circuit system is effectively split by axis of rotation, such that sway rams 42A and 42B serve a first circuit by feeding into one high pressure accumulator 84, and heave rams 44A and 44B serve a second circuit feeding into a second high pressure accumulator 86, all through the outlet valves 70. The pressured oil operates respective hydraulic motors 52, 54, which can operate respective electrical generators 60, excess pressure going through respective heat exchanges 62 to low pressure reservoirs 88 and 90, before returning to the rams 42, 44 through inlet valves 72.

The two circuits meet at the common central manifold 48, such that for normal operation, the two circuits can run linked, thereby increasing efficiency, especially in small seas. Each half of the hydraulic circuit can feed the separate hydraulic motors 52, 54, set to allow generation when the system is to be linked or to be separated.

With the circuits linked in small seas (when the system is below 50% power), this allows a single generator to be fed by both hydraulic circuits. This minimises the working hours of each generator, and allows the single generator to run at a nearer full load, dramatically increasing efficiency. In the event of a fault or leak with one half of the system, the circuits can be separated to allow the other half to function independently, maintaining restraint on the joints. The control of the split systems can be via bi-directional linking valves 58 in the central manifold 48.

Figure 11B:
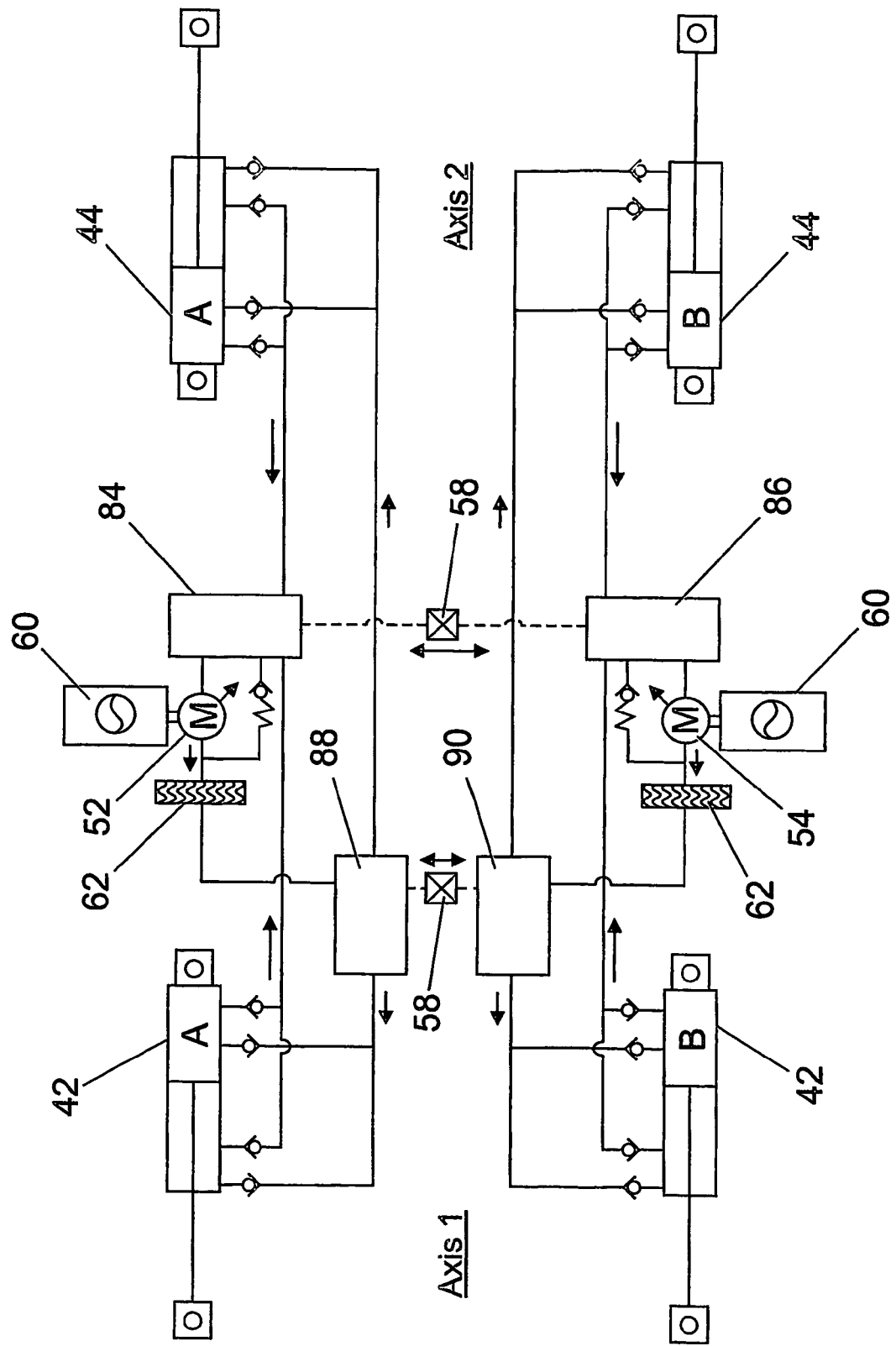

FIG. 11b shows schematically a second useable split hydraulic circuit system, wherein the two circuits are divided to separately serve the sway rams 42 and heave rams 44 on each axis of rotation, divided such that each system serves one ram from each axis of rotation, ensuring that restraint is maintained on both joint axes in the event of a single hydraulic circuit system failing. Again, the high-pressure accumulators 84 and 86 are linked by bi-directional link valves 58 to allow separate or linked operation of the circuits, depending upon sea conditions.

The motors 52, 54 are connected to a power conversion unit or units 60, which may comprise one or more parts. The power from the unit 60 could be connected directly to the grid, or used directly or indirectly to produce a useful by-product. Examples of useful by-products are hydrogen through electrolysis, and desalinated water.

The linkage unit 30 also includes one or more heat exchangers 62, such as an oil/water water heat exchanger, to release excess absorbed power back into the sea. This allows the linkage unit 30 to continue generating at full capacity in extreme conditions. In the event of electrical grid failure, this also provides the necessary thermal load.

The hydraulic oil used by the apparatus is preferably specified to be biodegradable, and non-toxic to water organisms.

The linkage unit 30 includes one or more access portals such as hatches. In the embodiment shown in the accompanying drawings, the linkage unit 30 has a first man-assessable hatchway 64 and a larger main-assessable hatchway 66. The linkage unit 30 may also include a separate or equipment loading hatchway.

Figure 12:
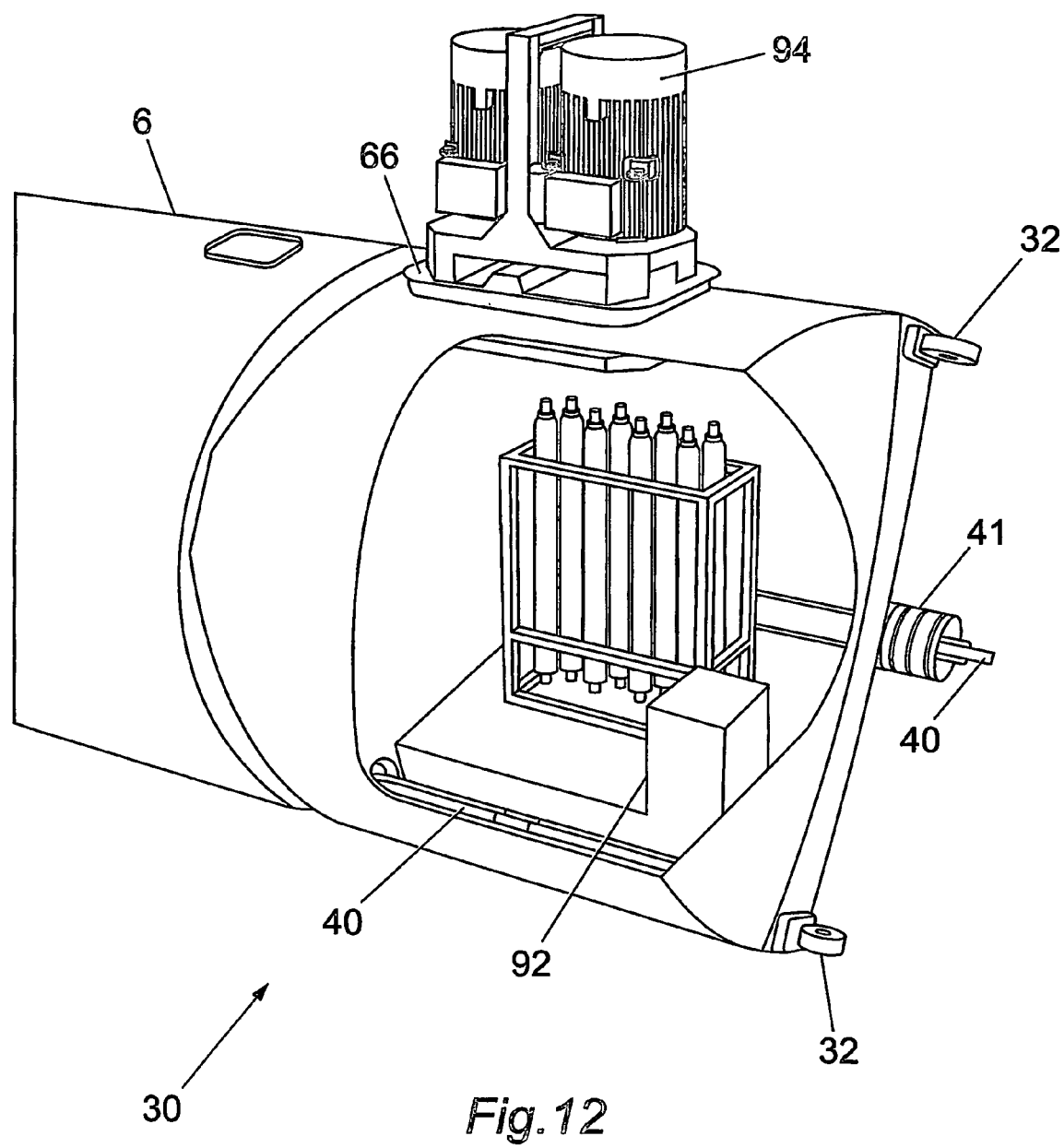

FIG. 12 shows a further schematic part cross-sectional perspective of the linkage unit 30 attached to a buoyant body member 6. Parts of the linkage unit 30 have not been shown in order to better illustrate the position of parts of the power conversion units already installed 92, and a further part 94 being installed through the main-access hatchway 66.

By housing all the significant components and parts for the power extracting in one linkage unit, this allows the unit to share components such as manifolds, pipework, fittings, mountings, power supply and batteries, etc. within a single unit, compared with previous known wave energy converters, including that shown in WO 00/17519. The unit 30 is therefore adapted for maintenance or repair within one unit, rather than requiring separate inspections.

Furthermore, the collations of the components in a single unit also allows their control to be carried out by a single joint controller, leading to further cost savings.

The configuration of the linkage unit 30 shown in the attached drawings also allows the hydraulic oil heat-exchangers 62 to be housed in the "U" channels at the ends of the linkage unit 30. The use of a 'box-cooler' unit in this space means that it is well protected, whilst generating sufficient flow of water past it to keep the cooler compact.

A further improvement in the present invention is the siting of the main bearings (and ram end bearings) so as to allow access from inside the unit 30 (or the body member end caps 38) for inspection and replacement. Preferably the unit 30 has external seals around each component extending from the unit 30, to prevent flooding, and to protect the hydraulic rams and other components from corrosion. This further assists when the inspection and/or replacement of components is taken place, such that the unit 30 does not have to be dry-docked for maintenance or repair of a ram, seal or other components. More preferably, each ram exit has two flexible seals, e.g. as "inner" and "outer", to provide back-up in the event of a failure.

A further advantage concerns the avoidance of the use of a joint spider 14 as shown in FIGS. 2-4. In this arrangement, the rams form the main load path through the whole apparatus. This is because the loads pass from one body member, through the main bearing into the rear of the hydraulic ram, and then pass straight through the module into the rod end mount in the end of the next body member. In the present invention, loads through the linkage unit 30 are reduced to shear loads, other environmental loads, and any small imbalance loads due to the differential areas of the rams. This means that the configuration can be more structurally efficient. Moreover, as loads on the linkage unit structure are small, access portal size can be significantly larger making installation of the components much easier. Lower structural loads around access portals also allows simpler sealing systems to be used.

The apparatus 2 is referenced predominantly against itself rather than against the shore or the seabed. This self referencing is achieved by the apparatus 2 being of length comparable to the incident wavelength, and the apparatus 2 being orientated relative to incident waves in a direction such that the apparatus 2 spans at least two crests of the incident waves.

The configuration and orientation of individual joints, and the type and rating of individual power extraction means which comprise a particular apparatus, are selected to maximise the power extracted from a given sea state, but to ensure survival in extreme conditions. In particular an overall roll bias angle ($\psi$) is preferably applied to the joint axes away from the horizontal and vertical so as to generate a cross coupling of the heave and sway motions of the apparatus 2 in response to wave forces. This response may be resonant with the incoming waves to further increase power capture. The roll bias angle is described in WO 00/17519.

Additionally or alternatively, the apparatus could include an active system to control the roll bias angle ($\psi$). In this way the active control system also controls the response of the apparatus in waves.

The same selection criteria determine the preferred orientation in relation to incident waves of the complete apparatus, when deployed.

Maximum power absorption by, and thus maximum power output from, the apparatus is generally achieved by coupling its body members using joints orientated in different directions, by applying the roll bias angle ($\psi$) to the joints, by applying different constraints to each direction to induce a cross-coupled response of varying magnitude and form which may be tuned to suit the wave conditions, and by using a system of moorings to present the apparatus in a preferred orientation relative to incoming waves.

The mooring system may also provide significant physical restraint or excitation to the apparatus so as to modify the overall response.

In calm weather, where wavelengths are relatively short, and wave amplitudes are small, there is a requirement to maximise power absorption by the apparatus.

In extreme weather, where wavelengths are longer and wave amplitudes are larger, survival of the apparatus is of greater importance than power absorption efficiency.

The total length of the assembled apparatus is therefore selected to be sufficiently long to provide adequate self referencing of itself in short wavelengths where not much power is available and there is a requirement to maximise power absorption, and sufficiently short to 'hide' in long wavelengths associated with storm waves in order to survive. If the wavelength is much greater than the length of the apparatus 2, then it cannot extend from peak to peak, and the maximum movement of any part of the apparatus 2 relative to any other part is less than the amplitude of the wave, so that it 'hides' in the long wavelength. In other words, the apparatus 2 loses the ability to reference itself against the wavelength. This effect is further discussed in WO 00/17519.

Each end face of the intermediate body members 6, 8 and the linkage unit 30, and the inner end faces of the end body members 4, 10, could be chamfered to allow clearance for extreme joint motion. The chamfered portions may lie on planes intersecting the joint axes in order that opposing faces meet to form a cushioning squeeze film. In the event that end-stops of the ram assemblies are reached this has the effect of reducing impact load.

The body members could also incorporate areas of sacrificial structure which allow very large joint angles before the overall structural integrity or flotation of the apparatus is compromised. These areas of sacrificial structure behave in a manner similar to crumple zone on a car.

Other components of the apparatus and the ram assemblies could similarly be designed to fail in a benign manner which does not compromise the integrity of the complete system when necessary.

In small seas, power capture can be maximised by orientating the apparatus 2 at an angle to the incident waves. In extreme seas, it is preferable that the apparatus 2 be orientated end on to the incident waves. This may be achieved by using an active or passive mooring system to present the apparatus 2 at an angle to the waves appropriate for maximum power capture, or appropriate for survival, as required. Illustrations of some possible mooring configurations are shown in WO 00/17519.

The present invention provides a single, compact, self-contained and manufacturable unit. This lends itself to efficient, centralised manufacture and testing, for shipment to a final assembly site. Thus, the main body members could be manufactured near the deployment site, and would require minimal fit-out before final assembly with the linkage unit. Further, the linkage units can be fully tested prior to transportation and installation on-site. Moreover, all the high technology, high valve and data components are within a single unit.

The invention claimed is:

1. A wave power apparatus comprising:
   a plurality of buoyant elongate body members, at least one adjacent pair of body members being interconnected by a linkage unit to form an articulated chain, each body member of said pair being connected to the respective linkage unit by linkage means permitting relative rotation of the body members;
   power extraction means adapted to resist and extract power from the relative rotation, the power extraction means being located substantially within each linkage unit;
   wherein each linkage unit is arranged to permit relative rotation between the linkage unit and a first body member about a first axis of rotation at only a first end of the linkage unit, and to permit relative rotation between the linkage unit and a second body member about a second axis of rotation only at a second end of the linkage unit;
   wherein the first and second axes of rotation are mutually orthogonal.

2. An apparatus as claimed in claim 1, wherein the body members are arranged consecutively in an articulated apparatus, each adjacent pair of body members being interconnected by a linkage unit to form an articulated chain.

3. An apparatus as claimed in claim 1, wherein the or each linkage unit has a longitudinal length substantially shorter than the body members.

4. An apparatus as claimed in claim 1, in which the body members substantially comprise hollow members devoid of active components.

5. An apparatus as claimed in claim 1, wherein each body member has one or more end caps with corresponding linkage means to marry with the linkage means of the linkage unit.

6. An apparatus as claimed in claim 1, wherein the power extraction means includes a hydraulic ram assembly.

7. An apparatus as claimed in claim 6, wherein the hydraulic ram assembly comprises a plurality of rams.

8. An apparatus as claimed in claim 6, wherein the power extraction means includes a hydraulic ram assembly for each axis of rotation.

9. An apparatus as claimed in claim 8, wherein the power extraction means includes two hydraulic ram assemblies acting about each axis of rotation.

10. An apparatus as claimed in claim 5, wherein the end caps have a number of cavities to receive respective ends of the power extraction means.

11. An apparatus as claimed in claim 1, wherein the power extraction means has at least one seal to prevent ingress of water into the linkage unit and/or body members.

12. An apparatus as claimed in claim 1, wherein the linkage unit includes one or more power generation or storage means connected to one or more of the power extraction means.

13. An apparatus as claimed in claim 12, wherein the linkage unit includes a first power generation means connected to one or more power extraction means at one axis of rotation, and a second power generation means connected to one or more power extraction means at the other axis of rotation.

14. An apparatus as claimed in claim 13, wherein the first or second power generation means is connectable to at least one power extraction means from each axis of rotation, such that the restraint of the linkage unit is maintained in the event of failure of one of the power extraction or generation means.

15. An apparatus as claimed in claim 13, wherein the first and second power generation means is connectable to one or more of the power extraction means from one or both axes of rotation, such that when the apparatus is operating at partial capacity, the one or more power extraction means is connected solely to the first or second power generation means.

16. An apparatus as claimed in claim 1, wherein constraint is applied to each power extraction means of the linkage unit in order to induce a cross-coupled response which may be tuned to be resonant in small waves to increase power capture and which may be set in large waves to limit power absorption and maximise survivability.

17. An apparatus as claimed in claim 1, wherein the apparatus includes one or more of a ballasting system, mooring system, and means to apply a roll bias angle to the axes of rotation.

18. An apparatus as claimed in claim 1, wherein the linkage unit includes access means, such as one or more hatches, to allow inspection, repair and maintenance on or off site.

19. A linkage unit for use in a wave power apparatus including a plurality of buoyant elongate body members, the linkage unit comprising:

linkage means for interconnection between the body members permitting relative rotation at either end of the unit;

power extraction means adapted to resist and extract power from the relative rotation of the body members;

the power extraction means being located substantially within the linkage unit; and wherein the linkage unit is arranged to permit relative rotation between the linkage unit and a first body member about a first axis of rotation only at a first end of the linkage unit, and to permit relative rotation between the linkage unit and a second body member about a second axis of rotation only at a second end of the linkage unit;

wherein the first and second axes of rotation are mutually orthogonal.

20. A linkage unit as claimed in claim 19, wherein the power extraction means includes a hydraulic ram assembly.

21. A linkage unit as claimed in claim 20, wherein the hydraulic ram assembly comprises a plurality of rams.

22. A linkage unit as claimed in claim 21, wherein the power extraction means includes a hydraulic ram assembly for each axis of rotation.

23. A linkage unit as claimed in claim 22, wherein the power extraction means includes two hydraulic ram assemblies acting about each axis of rotation.

24. A linkage unit as claimed in claim 19, wherein the power extraction means has at least one seal to prevent ingress of water into the linkage unit and/or body members.

25. A linkage unit as claimed in claim 19, wherein the linkage unit includes one or more power generation or storage means connected to one or more of the power extraction means.

26. A linkage unit as claimed in claim 25, wherein the linkage unit includes a first power generation means connected to one or more power extraction means at one axis of rotation, and a second power generation means connected to one or more power extraction means at the other axis of rotation.

27. A linkage unit as claimed in claim 26, wherein the first or second power generation means is connectable to at least one power extraction means from each axis of rotation, such that the restraint of the linkage unit is maintained in the event of failure of one of the power extraction or generation means.

28. A linkage unit as claimed in claim 27, wherein the first and second power generation means is connectable to one or more of the power extraction means from one or both axes of rotation, such that when the apparatus is operating at partial capacity, the one or more power extraction means is connected solely to the first or second power generation means.

29. A linkage unit as claimed in claim 19, wherein constraint is applied to each power extraction means of the linkage unit in order to induce a cross-coupled response which may be tuned to be resonant in small waves to increase power capture and which may be set in large waves to limit power absorption and maximize survivability.

30. A linkage unit as claimed in claim 19, including access means, such as one or more hatches, to allow inspection, repair and maintenance on site.

31. A method of extracting power from waves comprising:

deploying a wave power apparatus, the wave power apparatus comprising:

a plurality of buoyant elongate body members, at least one adjacent pair of body members being interconnected by a linkage unit to form an articulated chain, each body member of said pair being connected to the respective linkage unit by linkage means permitting relative rotation of the body members;

power extraction means adapted to resist and extract power from the relative rotation, the power extraction means being located substantially within each linkage unit;

wherein each linkage unit is arranged to permit relative rotation between the linkage unit and a first body member about a first axis of rotation only at a first end of the linkage unit, and to permit relative rotation between the linkage unit and a second body member about a second axis of rotation only at a second end of the linkage unit;

wherein the first and second axes of rotation are mutually orthogonal;

the method further comprising:

orientating the structure such that a front end of the structure faces into the oncoming waves; and extracting the power absorbed in the or each linkage unit.

32. A method of manufacturing a wave power apparatus including a plurality of buoyant elongate body members, the method comprising:

interconnecting each pair of adjacent body members of the apparatus with a linkage unit, the linkage unit comprising:

linkage means for interconnection between the body members permitting relative rotation at either end of the unit;

power extraction means adapted to resist and extract power from the relative rotation of the body members;

the power extraction means being located substantially within the linkage unit; and wherein the linkage unit is arranged to permit relative rotation between the linkage unit and a first body member about a first axis of rotation only at a first end of the linkage unit, and to permit relative rotation between the linkage unit and a second body member about a second axis of rotation only at a second end of the linkage unit;

wherein the first and second axes of rotation are mutually orthogonal.

33. The method of claim 32, wherein the body members and linkage unit(s) are connected together close to or on site.

34. The method of claim 32, wherein the linkage unit(s) are fully assembled and tested before being transported to site.

* * * * *

UNITED STATES PATENT AND TRADEMARK OFFICE
CERTIFICATE OF CORRECTION

PATENT NO. : 7,443,045 B2
APPLICATION NO. : 10/551811
DATED : October 28, 2008
INVENTOR(S) : Richard Yemm Page 1 of 1

It is certified that error appears in the above-identified patent and that said Letters Patent is hereby corrected as shown below:

At Col. 10, line 62, "at only" should be --only at--.

Signed and Sealed this

Third Day of February, 2009

JOHN DOLL
*Acting Director of the United States Patent and Trademark Office*